(12) United States Patent
Sugata et al.

(10) Patent No.: US 6,843,624 B2
(45) Date of Patent: Jan. 18, 2005

(54) MACHINE TOOL (75) Inventors: Shinsuke Sugata, Fukuyama (JP); Yoshihide Seo, Hiroshima-ken (JP)

(73) Assignee: Horkos Corp., Fukuyama (JP)

( * ) Notice: Subject to any disclaimer, the term of this patent is extended or adjusted under 35 U.S.C. 154(b) by 106 days.

(21) Appl. No.: 10/381,750

(22) PCT Filed: Sep. 14, 2001

(86) PCT No.: PCT/JP01/08026

§ 371 (c)(1),
(2), (4) Date: Mar. 28, 2003

(87) PCT Pub. No.: WO02/30616

PCT Pub. Date: Apr. 18, 2002

(65) Prior Publication Data

US 2003/0190206 A1 Oct. 9, 2003

(30) Foreign Application Priority Data

Oct. 12, 2000 (JP) .......... 2000-311916

(51) Int. Cl.$^7$ .......... B23C 1/027
(52) U.S. Cl. .......... 409/235; 409/191; 409/141; 409/238; 408/234
(58) Field of Search .......... 409/235, 191, 409/190, 185, 238, 239, 202, 212; 408/234, 143

(56) References Cited

U.S. PATENT DOCUMENTS

| | | | | |
|---|---|---|---|---|
| 2,926,236 A | * | 2/1960 | Claude .......... | 409/235 |
| 4,987,668 A | * | 1/1991 | Roesch .......... | 409/212 |
| 5,988,959 A | * | 11/1999 | Sugata .......... | 408/235 |
| 6,161,995 A | * | 12/2000 | Wakazono et al. .......... | 409/191 |
| 6,519,823 B1 | * | 2/2003 | Sugata et al. .......... | 409/202 |
| 6,551,038 B1 | * | 4/2003 | Sugata et al. .......... | 409/191 |

FOREIGN PATENT DOCUMENTS

| | | | |
|---|---|---|---|
| JP | 4-365529 A | | 12/1992 |
| JP | 11-216633 A | * | 8/1999 |
| JP | 2000-24853 A | | 1/2000 |
| JP | 2001-9652 A | | 1/2001 |

OTHER PUBLICATIONS

Microfilm of the specification and drawings annexed to the request of Japanese Utility Model Application No. 30105/1986 (Laid–Open No. 144133/1987), (Toyo Seiki Kogyo K.K.), Sep. 11, 1987. (JP62–144133 U).

* cited by examiner

*Primary Examiner*—Erica Cadugan
(74) *Attorney, Agent, or Firm*—Merek, Blackmon & Voorhees, LLC (57) ABSTRACT

A machine tool capable of performing an accurate machining by preventing a second saddle 6 from displacing aslant to suppress the vibrations of a spindle head 8, wherein a column 2 is fixedly installed on bed 1, a first saddle 4 is movably guided by the column 2 in vertical direction f1, a second saddle 6 is movably guided by the first saddle 4 in lateral direction f2, a spindle head 8 is movably guided by the second saddle 6 in longitudinal direction 18, and inter-fitted guide route devices 5A, 5B, 5C for guiding the second saddle 6 in lateral direction f2 are formed at the rear lower position of the first saddle 4 as well as at the front upper and lower positions of the first saddle 4.

10 Claims, 7 Drawing Sheets

MACHINE TOOL

FIELD OF THE INVENTION

The present invention relates to a machine tool increasing in position stability of a spindle.

BACKGROUND OF THE INVENTION

A machine tool capable of shortening the length of spindle direction (longitudinal direction) of a first saddle, a second saddle and a column as well as speeding up the longitudinal feed of a spindle head, wherein the column is fixedly on a bed, the first saddle is movably guided by the column in vertical direction, the second saddle is movably guided by the first saddle in lateral direction, and the spindle head is movably guided by the second saddle in longitudinal direction, has been known (See Japanese Patent Provisional Publication No. 365529 of 1992, for example).

In this machine tool, when the first saddle and the second saddle are moved in vertical and lateral direction or when the spindle head is moved in longitudinal direction, the second saddle is hard to attempt the position stability. Unless the second saddle has sufficient position stability, there occurs the problem that a spindle vibrates and working can not be carried out high-accurately.

The present invention aims to provide a machine tool that can settle the problem.

SUMMARY OF THE INVENTION

To achieve the above-mentioned purpose, the invention is characterized by a machine tool wherein a column is fixedly installed on a bed, a rectangular frame first saddle is movably guided by the column in vertical direction, a rectangular frame second saddle with a smaller width than the first saddle is movably guided by the first saddle in lateral direction within the range of the width of the first saddle, a spindle head is movably guided inside the second saddle in longitudinal direction, and guide route means for guiding the second saddle in lateral direction are formed at the rear upper and lower lateral members of a rectangular frame of the first saddle or at either thereof as well as at the front upper and lower lateral members of the rectangular frame of the first saddle.

According to this, the first saddle guides the second saddle through at least three guide route means. Besides, two opposite guide route means in longitudinal direction among these have longitudinal floating regulated by the second saddle part therebetween strictly. Therefore, the second saddle can secure position stability at an optional position in the lateral moving range thereof.

The machine tool is constituted so that the column is fixedly installed on the bed, the rectangular frame first saddle is movably guided by the column in vertical direction, the rectangular frame second saddle with the smaller width than the first saddle is movably guided by the first saddle in lateral direction within the range of the width of the first saddle, the spindle head is movably guided inside the second saddle in longitudinal direction, and the guide route means for guiding the second saddle in lateral direction are formed at the rear lower and upper lateral members of the rectangular frame of the first saddle as well as at the front upper and lower lateral members of the rectangular frame of the first saddle.

According to this, when the upper and lower parts of the second saddle are reinforced as a spindle head supporting member, the supporting member effectively contributes as a support structure of two guide route means at the upper and lower positions of the first saddle and transmits floating control force of two guide route means to the second saddle.

These inventions are materialized as follows. That is, the guide route means comprise route members and interfitting members that slidably move fitted in the route members. In this case, the route members are fixed on the first saddle or the second saddle. Besides, the interfitting members are fixed on the second saddle when the route members are fixed on the first saddle, and on the first saddle when the route members are fixed on the second saddle as well.

According to this, the guide route means are easily formed by well-known means, and the route members and the interfitting members can relatively slide on the first saddle to the second saddle in the state where floating is controlled.

In a machine tool according to the present invention, a spindle head can stably move in the state where inclination displacement due to component floating of the guide route means is hard to occur because of its own weight.

BRIEF DESCRIPTION OF THE DRAWINGS

FIG. 6A is a perspective view, and FIG. 6B is a sectional view taken on line X1—X1.

PREFERRED EMBODIMENT OF THE INVENTION

The invention will be described with reference to the drawings.

In this embodiment, a machine tool comprises a bed 1 forming the lowest part, a column 2 fixed on the upper surface of the bed 1, a first saddle 4 slidably-movably guided in vertical direction f1 through a pair of vertical guide route means 3A, 3B provided to the front surface of the column 2, a second saddle 6 slidably-movably guided in lateral direction f2 through a pair of lateral guide route means 6A, 5B, 5C provided to three positions of the front upper and lower positions and the rear lower position of the first saddle 4, and a spindle head 8 slidably-movably guided in longitudinal direction f3

Figure 1:
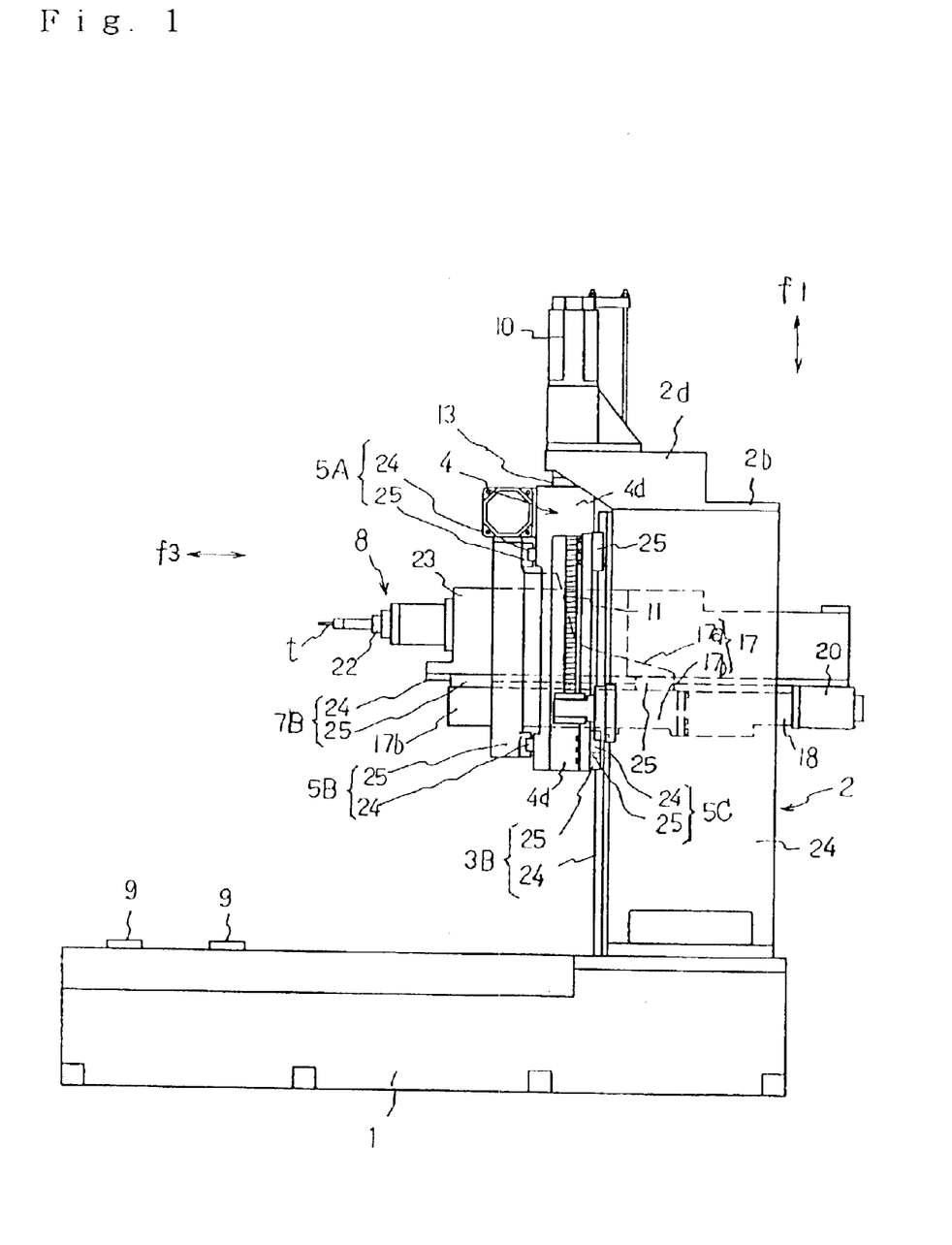
FIG. 1 is a side view of a machine tool concerning the first embodiment of the invention.
Figure 2:
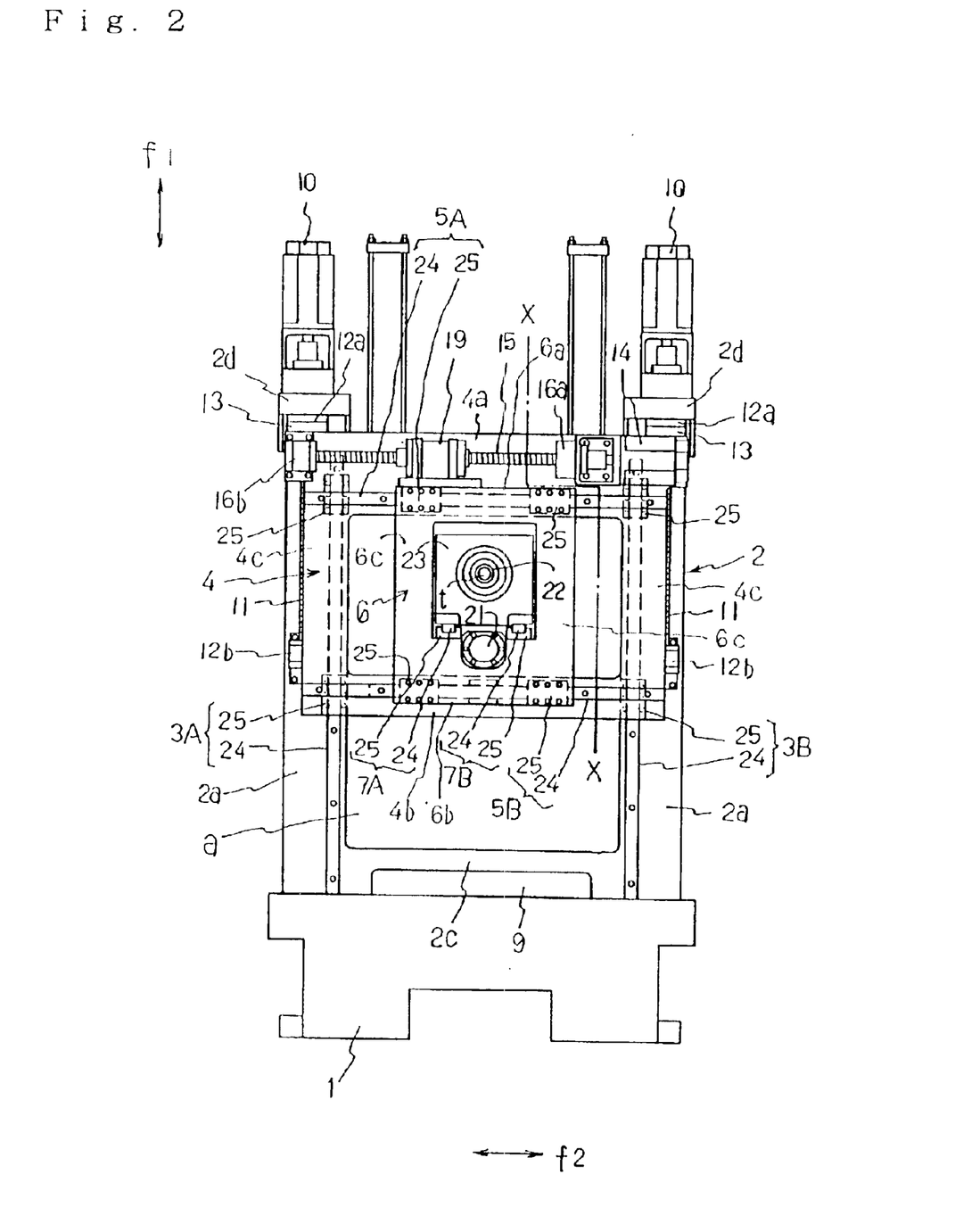
FIG. 2 is a front view thereof.
Figure 3:
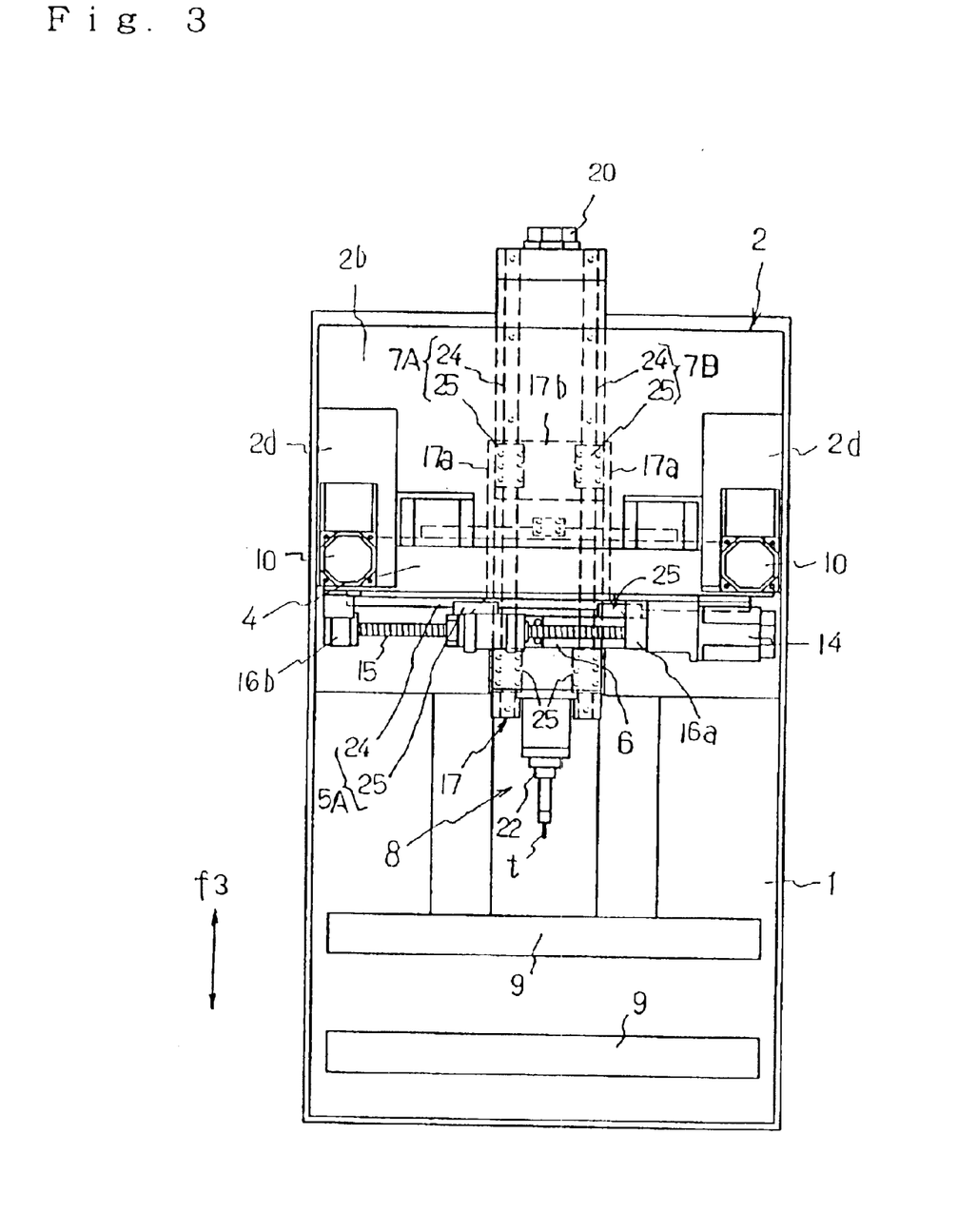
FIG. 3 is a plan view thereof.
Figure 4:
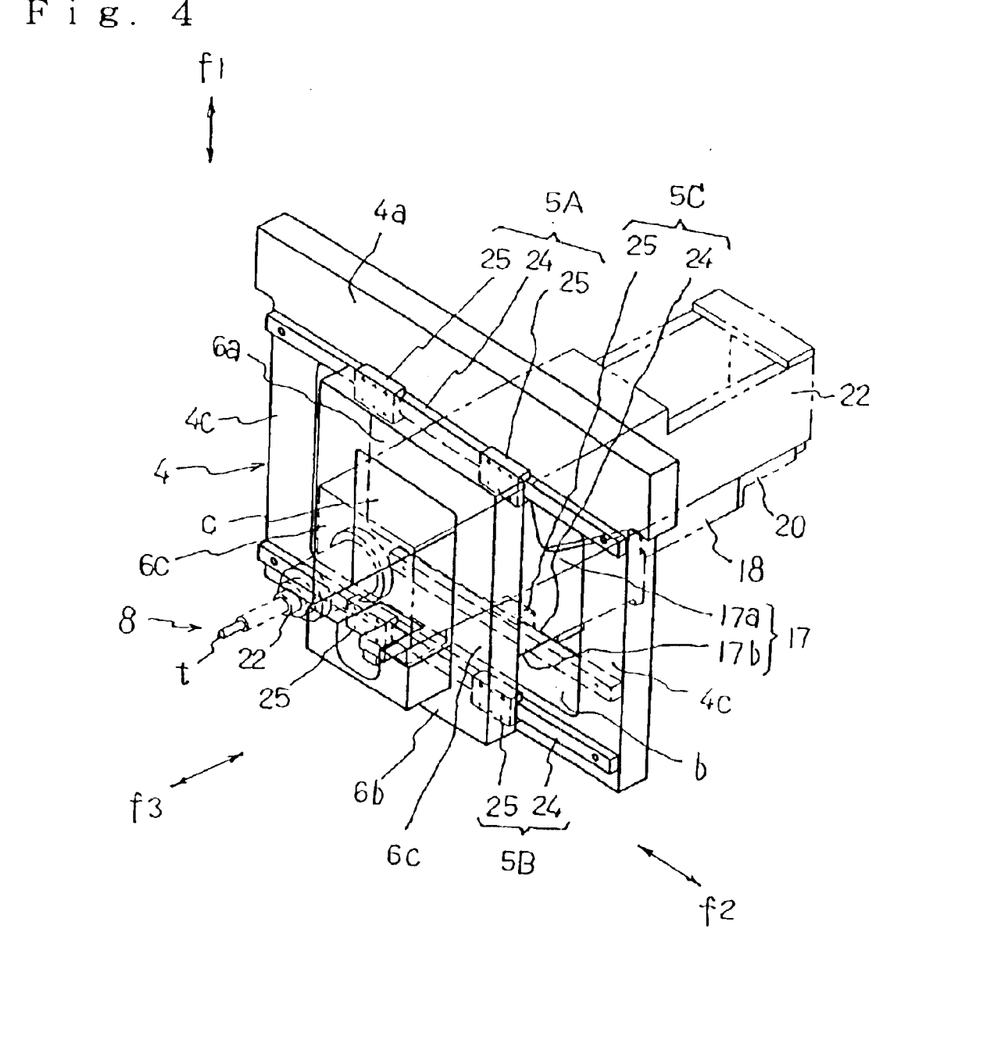
FIG. 4 is a perspective view of an important part of the machine tool.
Figure 5:
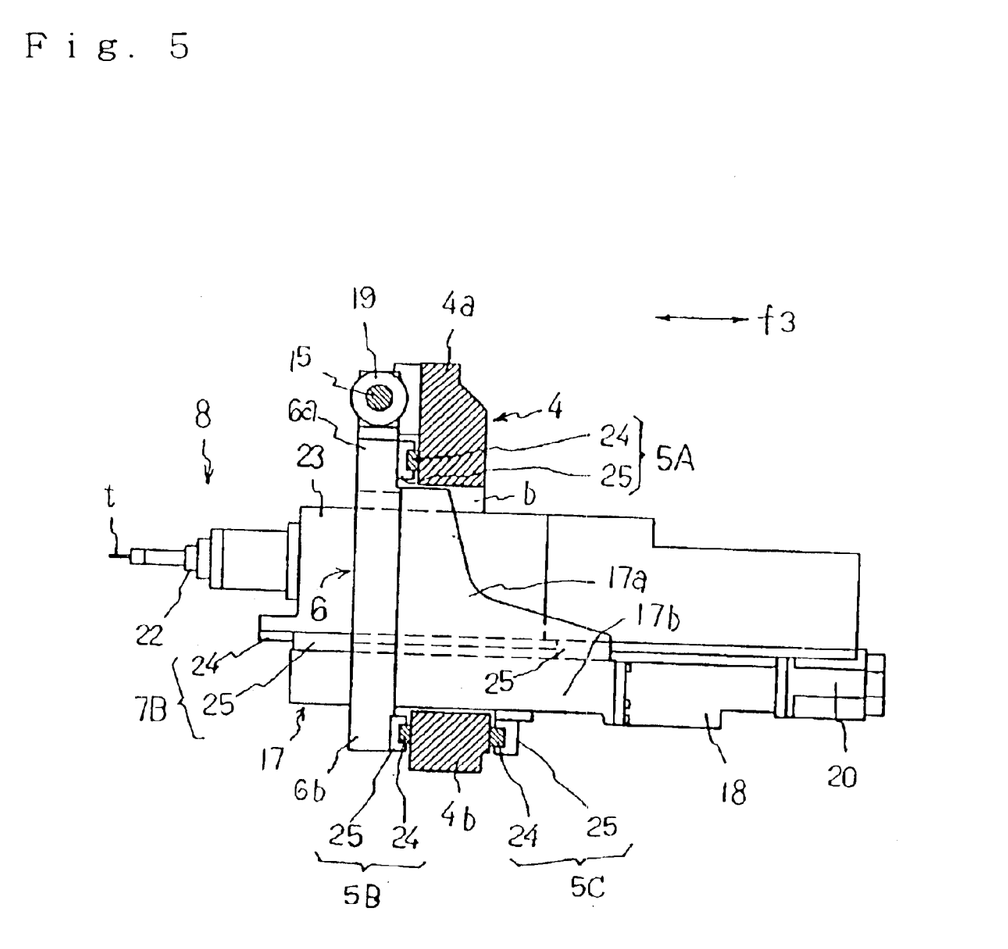
FIG. 5 is a sectional view taken on line X—X in FIG. 2 at a side sight, showing an important part of the machine tool.
Figure 6:
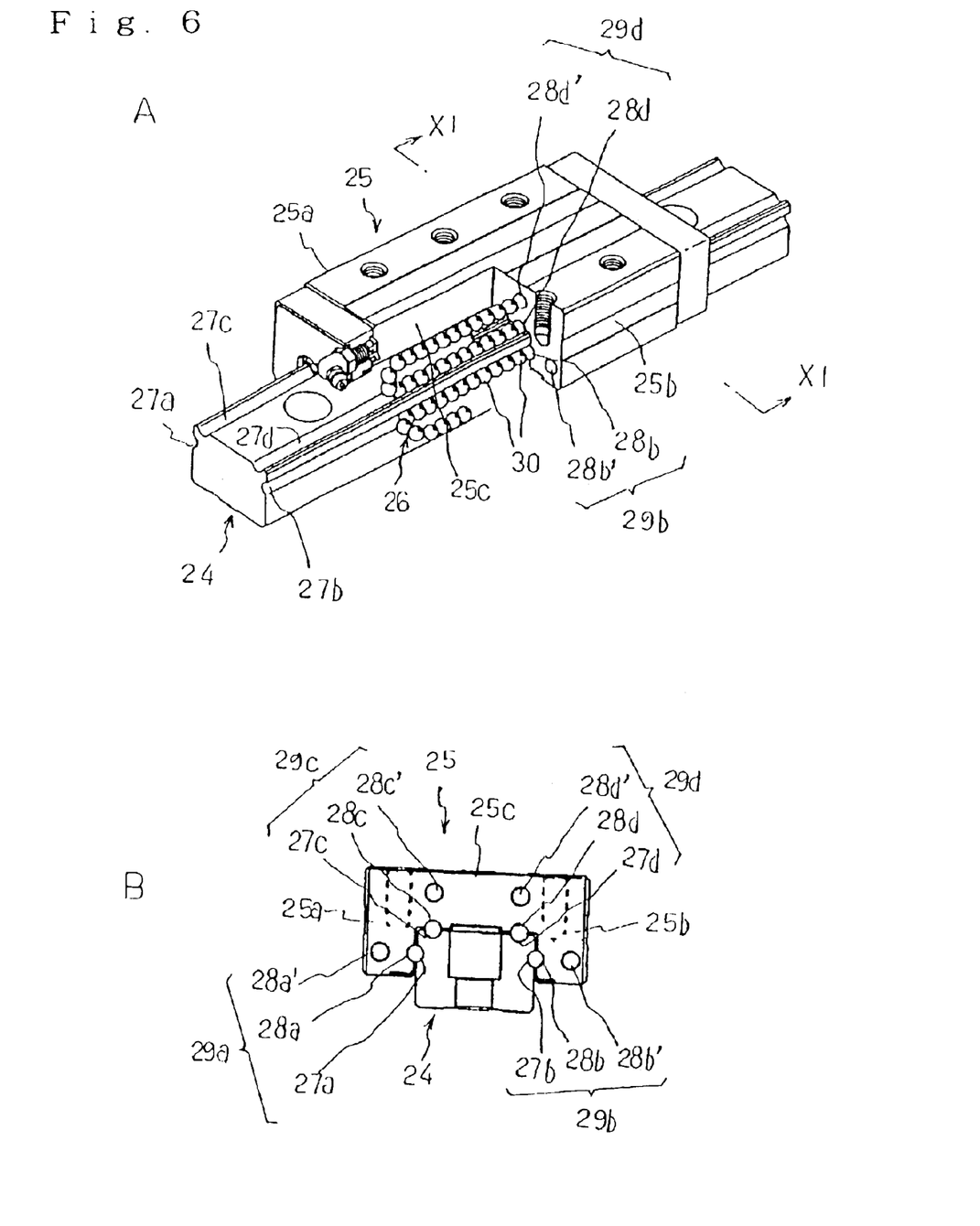
FIG. 6 illustrates guide route means of the machine tool.
Figure 7:
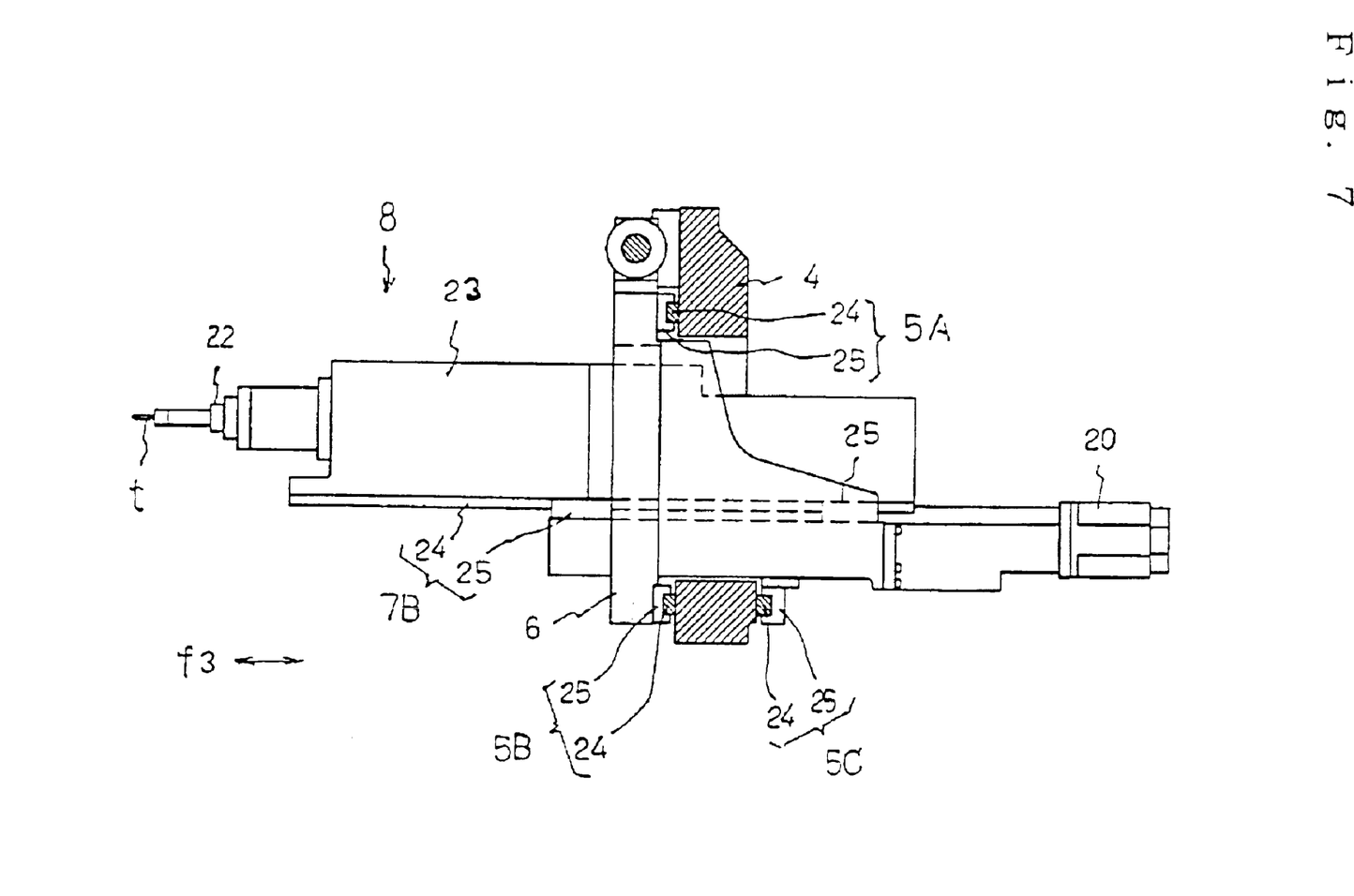
FIG. 7 is an operating explanatory view showing the state that a spindle head of the machine tool is moved to the forefront within a movable range to the second saddle.

The second saddle 6, as shown in FIGS. 4, 6, comprises one pair of right and left lateral parts 6a, 6b each having a rectangular cross-section and one pair of upper and lower vertical parts 6c, 6c each having a rectangular cross-section, consisting chiefly of a vertical rectangular frame body made of fettling steel having a longitudinal space "c" into which the spindle head 8 is inserted on its central inside. Besides, the size of the second saddle 6 at front sight is accepted in the front of the first saddle 4 and a spindle head supporting member 17 having right and left side surfaces 17a, 17a and a horizontal surface 17b is integrally provided to the rear lower position as shown in FIG. 2. Moreover, a motor-table 18 is fixed on the rear end surface of the supporting member 17 so as to extend backward, and a nut body 19 for receiving the lateral screw axis 15 is fixed on the top of the upper lateral part 6a.

A servomotor 20 for moving the spindle head 8 in longitudinal direction f3 is fixed on the rear end surface of the motor-table 18. A bearing member 21 for rotatively supporting a not-illustrated spindle longitudinal screw axis screwed in an output axis of the servomotor 20 is fixed on the front and rear positions in the center of the width of the horizontal surface part 17b as shown in FIG. 2.

The spindle head 8 has a head frame 23 for rotatively supporting a longitudinal spindle 22 and a not-illustrated driving motor for rotating the spindle 22 is provided there-inside. A not-illustrated nut body for receiving the spindle longitudinal screw axis is fixed on the middle of the longitudinal length in the center of the width of the head frame 23.

Next, an explanation follows about each of the guide route means 3A, 3B, 5A, 5B, 5C, 7A, 7B.

Any of the guide route means 3A, 3B, 5A, 5B, 5C, 7A, 7B is called a liner motion bearing and well known. As shown in FIG. 6, these comprise a straight route member 24, interfitting members 25, and engaging means 26, respectively. The interfitting members 25 slidably move with fitted in the route member 24. Besides, the engaging means 26 make possible smooth relative sliding of the route members 24 and the interfitting members 25, where separation of the route members 24 and the be deformed in accordance with the rollers. According to this too, the same action as the case where it is based on the spheres 30 is obtained.

The rail members 24 of the guide route means 3A, 3B, 5A, 5B, 5C, 7A, 7B and the interfitting members 25 can also do the required action without the engaging means 26 such as the spheres 30 and the rollers. For example, the cross-section of interfitting member 25 is formed in inner-spread such as a C letter shape, and the rail members 24 are closely inserted into the inside space of the C letter shape. According to this too, the required guidance action is obtained by an adequate lubricating means.

INDUSTRIALLY APPLICABLE UTILITY

According to the invention, the following effects can be obtained.

According to the present invention, the first saddle guides the second saddle through three guide route means. Besides, two opposite guide route means in longitudinal direction are strictly restricted the longitudinal floating by the second saddle part between these guide route means. Therefore, the second saddle can secure the position stability at the optional position within the lateral moving range, thereby preventing the spindle head from vibrating as well as enabling to carry out a high-accurate machining.

According to the present invention, when reinforcing the upper and lower parts of the second saddle as a spindle head supporting member, the supporting member effectively contributes as a supporting structure of two guide route means at the upper and lower positions of the first saddle and effectively transfers floating control force due to two guide route means to the whole second saddle.

According to the present invention, the guide route means can be easily formed by well-known means. Besides, the second saddle can relatively slide on the first saddle through the route members and interfitting members in the state where the floating is restricted.

According to the present invention, the spindle head can stably move in the state where the inclination displacement due to the component floating of the guide route means is hard to occur because of it own weight. Therefore, vibrations of the spindle head are effectively prevented, thereby enabling to machine accurately.

What is claimed is:

1. A machine tool comprising:
    a bed (1);
    a column (2) fixedly installed on said bed (1);
    a rectangular frame first saddle (4) movably guided by said column (2) in a vertical direction (f1);
    a rectangular frame second saddle (6) movably guided by said first saddle (4) in a lateral direction (f2) within the range of a width of the first saddle (4), a width of the second saddle (6) being smaller than that of the first saddle (4); and
    a spindle head (8) for holding a tool at a front thereof, said spindle head movably guided inside said second saddle (6) in a longitudinal direction (f3) of the spindlehead,
    wherein guide route means (5A, 5B, 5C) for guiding the second saddle (6) in the lateral direction (f2) are formed at front upper and lower lateral positions of the first saddle (4), or are formed at either of the front upper and lower lateral positions of the first saddle (4),
    and wherein guide route means for guiding the second saddle (6) in the lateral direction are also formed at a rear lateral position of the first saddle (4).

2. A machine tool as claimed in claim 1, wherein the guide route means (5A, 5B, 5C) for guiding the second saddle (6) in the lateral direction (f2) comprise route members (24) and interfitting members (25) slidably displaced along the route members (24).

3. A machine tool as claimed in claim 2, wherein the route members (24) are fixed on the first saddle (4) and the interfitting members (25) are fixed on the second saddle.

4. A machine tool as claimed in claim 1, wherein a spindle head supporting member (17) having right and left side surfaces (17a, 17a) and a horizontal surface (17b) is integrally provided to the rear lower position of the second saddle (6), a motor-table (18) is fixed on the rear end of the spindle head supporting member (17) and is extended backwardly from the spindle head supporting member, and a bearing member (21) for rotatively supporting a spindle longitudinal screw axis screwed in an output axis of a motor (20) fixed on the motor-table (18) is installed at the front and rear positions in the center of the width of the horizontal surface (17b).

5. A machine tool as claimed in claim 1, wherein the guide route means for guiding the second saddle (6) in the lateral direction that are formed at the rear lateral position of the first saddle are formed at a lower position of the first saddle.

6. A machine tool comprising:
    a bed (1);
    a column (2) fixedly installed on said bed (1);
    a rectangular frame first saddle (4) movably guided by said column (2) in a vertical direction (f1);
    a rectangular frame second saddle (6) movably guided by said first saddle (4) in a lateral direction (f2) within the range of a width of the first saddle (4), a width of the second saddle (6) being smaller than that of the first saddle (4); and
    a spindle head (8) for holding a tool at a front thereof, said spindle head movably guided inside said second saddle (6) in a longitudinal direction (f3) of the spindlehead, wherein guide route means (5A, 5B, 5C) for guiding the second saddle (6) in the lateral direction (f2) are formed at front upper and lower lateral positions of the first saddle (4), and wherein guide route means for guiding the second saddle (6) in the lateral direction are also formed at a rear lateral position of the first saddle (4).

7. A machine tool as claimed in claim 6, wherein the guide route means (5A, 5B, 5C) for guiding the second saddle (6) in the lateral direction (f2) comprise route members (24) and interfitting members (25) slidably displaced along the route members (24).

8. A machine tool as claimed in claim 7, wherein the route members (24) are fixed on the first saddle (4) and the interfitting members (25) are fixed on the second saddle (6).

9. A machine tool as claimed in claim 6, wherein a spindle head supporting member (17) having right and left side surfaces (17a, 17a) and a horizontal surface (17b) is integrally provided to the rear lower position of the second saddle (6), a motor-table (18) is fixed on the rear end of the spindle head supporting member (17) and is extended backwardly from the spindle head supporting member, and a bearing member (21) for rotatively supporting a spindle longitudinal screw axis screwed in an output axis of a motor (20) fixed on the motor-table (18) is installed at the front and rear positions in the center of the width of the horizontal surface (17b).

10. A machine tool as claimed in claim 6, wherein the guide route means for guiding the second saddle (6) in the lateral direction that are formed at the rear lateral position of the first saddle are formed at a lower position of the first saddle.

* * * * *